United States Patent [19]  [11] Patent Number: 4,559,388
Liu et al.  [45] Date of Patent: Dec. 17, 1985

[54] COPOLYESTER-CARBONATE COMPOSITION

[75] Inventors: Ping Y. Liu, Naperville, Ill.; Edward L. Belfoure, New Harmony, Ind.

[73] Assignee: General Electric Company, Mt. Vernon, Ind.

[21] Appl. No.: 683,660

[22] Filed: Dec. 19, 1984

[51] Int. Cl.⁴ .............................................. C08L 69/00
[52] U.S. Cl. .................................... 525/146; 524/508; 524/513; 525/148; 525/147
[58] Field of Search ................. 525/146, 147, 148, 67, 525/439; 524/508, 513

[56] References Cited

U.S. PATENT DOCUMENTS 4,476,274 10/1984 Liu ....................................... 525/147
4,481,331 11/1984 Liu ....................................... 525/146

FOREIGN PATENT DOCUMENTS 3234174 3/1984 Fed. Rep. of Germany .

Primary Examiner—Theodore E. Pertilla
Attorney, Agent, or Firm—Myron B. Kapustij; Martin B. Barancik

[57] ABSTRACT

Copolyester-carbonate resin containing composition comprising, in physical admixture:
 (i) at least one aromatic copolyester-carbonate resin;
 (ii) at least one aromatic polycarbonate resin;
 (iii) at least one amorphous polyester resin; and
 (iv) at least one polymer selected from
  (a) an olefin acrylate copolymer,
  (b) a polyolefin, and
  (c) an olefin diene trepolymer.

This composition contains amounts of components (ii)–(iv) effective to improve the resistance to mild organic solvents and the impact properties of the copolyester-carbonate resin.

32 Claims, No Drawings

COPOLYESTER-CARBONATE COMPOSITION

BACKGROUND OF THE INVENTION

Copolyester-carbonate resins are well known commercially available materials which, due to their many advantageous properties, are finding increasing use as thermoplastic engineering materials. Such copolyester-carbonates may be prepared by the reaction of a dihydric phenol, a carbonate precursor, and an ester precursor. The copolyester-carbonates exhibit high heat resistance, good dimensional stability, good tensile strengths, and good impact strengths. However, in certain applications the use of aromatic copolyester-carbonate resins is limited because they exhibit environmental stress crazing and cracking. "Environmental stress crazing and cracking" refers to the type of failure which is hastened by the presence of organic solvents such as, for example, the weak organic solvents such as toluene, mineral spirits, and the like, when such solvents are in contact with stressed parts fabricated from aromatic copolyester-carbonate resins. The most significant effect is loss of vital impact strength and also an increase in brittle type failure. Contact with such solvents may occur, for example, when parts are used in or around the windshields of automobiles, since most windshield washer solutions contain some of these weak organic solvents, or when these weak organic solvents are used to clean or degrease stressed parts made from copolyester-carbonate resins.

It is an object of the instant invention to provide copolyester-carbonate resin containing compositions exhibiting improved resistance to relatively weak organic solvents, particularly those present in windshield washing solutions.

SUMMARY OF THE INVENTION

The instant invention is directed to copolyester-carbonate resin compositions exhibiting improved resistance to environmental stress crazing and cracking. These copolyester-carbonate resin compositions are comprised of, in admixture:
(i) an aromatic copolyester-carbonate resin;
(ii) an aromatic polycarbonate resin;
(iii) an amorphous polyester resin; and
(iv) a polymer selected from
 (a) an olefin acrylate copolymer,
 (b) a polyolefin, and
 (c) an olefin rubbery diene terpolymer; components (ii)–(iv) being present in amounts effective to improve the impact properties and environmental stress crazing and cracking properties of the copolyester-carbonate resin.

DESCRIPTION OF THE INVENTION

In accordance with the instant invention there are provided copolyester-carbonate resin compositions exhibiting improved environmental stress crazing and cracking properties, i.e., improved resistance to relatively weak organic solvents, and improved impact properties. These compositions comprise, in physical admixture:
(i) at least one high molecular weight thermoplastic aromatic copolyester-carbonate resin;
(ii) at least one high molecular weight thermoplastic aromatic polycarbonate resin;
(iii) at least one amorphous polyester resin; and
(iv) at least one polymer selected from
 (a) a copolymer of an olefin and at least one of a $C_1$–$C_6$ alkyl acrylate, a $C_1$–$C_6$ alkyl methacrylate, acrylic acid, methacrylic acid, or mixtures thereof,
 (b) a polyolefin, preferably a polyolefin copolymer, and
 (c) an olefin rubbery diene terpolymer.

These compositions contain amounts of components (ii)–(iv) which are effective to positively upgrade the environmental stress crazing and cracking properties and the impact properties of the copolyestercarbonate resin.

Briefly stated the high molecular weight thermoplastic aromatic copolyester-carbonates comprise recurring carbonate groups, carboxylate groups, and aromatic carbocyclic groups in the polymer chain in which at least some of the carbonate groups and at least some of the carboxylate groups are bonded directly to the ring carbon atoms of the aromatic carbocyclic groups.

Those copolyester-carbonates contain ester bonds and carbonate bonds in the chain, wherein the amount of the ester bonds (ester content) is in the range of from about 25 to about 90 mole percent, preferably from about 35 to about 80 mole percent ester bonds (ester content). For example, 5 moles of bisphenol-A reacting completely with 4 moles of isophthaloyl dichloride and 1 mole of phosgene would give a copolyester-carbonate of 80 mole percent ester bonds (ester content).

The copolyester-carbonates of the instant invention, as well as methods for their preparation, are disclosed, inter alia, in U.S. Pat. Nos. 3,169,121, 4,238,596, 4,156,069 and 4,238,597, all of which are incorporated herein by reference.

The copolyester-carbonates may be prepared by a variety of methods including melt polymerization, transesterification, and the interfacial polymerization processes.

These copolyester-carbonates may be readily prepared by the reaction of (i) at least one dihydric phenol, (ii) a carbonate precursor, and (iii) at least one ester precursor.

The dihydric phenols useful in the preparation of the instant copolyester-carbonates may be represented by the general formula

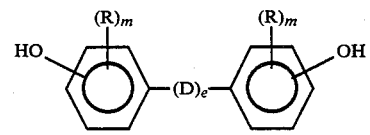

wherein:
R is independently selected from halogen and monovalent hydrocarbon radicals;
D is selected from divalent hydrocarbon radicals,

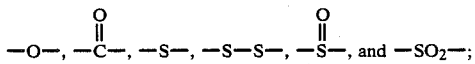

m is independently selected from integers having a value of from 0 to 4 inclusive; and
e is either zero or one.

The monovalent hydrocarbon radicals represented by R include the alkyl, cycloalkyl, aryl, aralkyl, and alkaryl radicals. Preferred alkyl radicals are those containing from 1 to about 10 carbon atoms. Preferred cycloalkyl radicals are those containing from 4 to about 8 ring carbon atoms. Preferred aryl radicals are those containing from 6 to 12 ring carbon atoms, i.e., phenyl, naphthyl, and biphenyl. Preferred aralkyl and alkaryl radicals are those containing from 7 to about 14 carbon atoms.

The divalent hydrocarbon radicals represented by D include alkylene, alkylidene, cycloalkylene and cycloalkylidene radicals. The preferred alkylene radicals are those containing from 2 to about 20 carbon atoms. The preferred alkylidene radicals are those containing from 1 to about 20 carbon atoms. The preferred cycloalkylene and cycloalkylidene radicals are those containing from 4 to about 16 ring carbon atoms.

Some illustrative non-limiting examples of the dihydric phenols falling within the scope of Formula I include:
2,2-bis(4-hydroxyphenyl)propane (bisphenol-A);
1,1-bis(4-hydroxyphenyl)propane;
1,5-bis(4-hydroxyphenyl)pentane;
1,1-bis(4-hydroxyphenyl)decane;
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3-methyl-5-chloro-4-hydroxyphenyl)cyclohexane;
1,3-bis(4-hydroxyphenyl)propane;
bis(4-hydroxyphenyl)ether;
p,p'-dihydroxydiphenyl;
4,4'-thiodiphenol; and
bis(3,5-diisopropyl-4-hydroxyphenyl)sulfone.

Other useful dihydric phenols are disclosed in U.S. Pat. Nos. 3,169,121, 2,999,835, 3,027,365, 3,334,154, 3,035,021, 3,036,036, 3,036,037, 3,036,038, 3,036,039 and 4,111,910, all of which are incorporated herein by reference.

It is, of course, possible to employ a mixture of two or more different dihydric phenols as well as individual dihydric phenols in the preparation of the instant copolyester-carbonates.

The preferred dihydric phenols are the 4,4'-bisphenols.

The carbonate precursor may be a carbonyl halide, a carbonate ester, or a bishaloformate. The carbonyl halides which may be employed herein are carbonyl bromides, carbonyl chloride, and mixtures thereof. Typical carbonate esters which may be employed are diphenyl carbonate; di(halophenyl)carbonates such as di(chlorophenyl)carbonate, di(bromophenyl)carbonate, di(trichlorophenyl)carbonate, etc,; di(alkylphenyl)carbonates such as di(tolyl)carbonate, etc., phenyl tolyl carbonate; chlorophenyl chloronaphthyl carbonate, etc., or mixtures thereof. The bishaloformates suitable for use herein include the bishaloformates of dihydric phenols such as the bischloroformates of hydroquinone, bischloroformate of bisphenol-A, and the like; or bishaloformates of glycols such as the bischloroformates of ethylene glycol, polyethylene glycol, neopentyl glycol, and the like. The preferred carbonate precursor is carbonyl chloride, also known as phosgene.

The ester precursor may be a difunctional carboxylic acid or, preferably, the ester forming reactive derivative of the difunctional carboxylic acid. In general, any difunctional carboxylic acid, and preferably any ester forming reactive derivative thereof, conventionally used in the preparation of linear polyesters may be utilized in the preparation of the instant copolyester-carbonates. In general the difunctional carboxylic acids, preferably their ester forming reactive derivatives, include the aliphatic carboxylic acids, the aromatic carboxylic acids, and the aliphatic-aromatic carboxylic acids, and their ester forming reactive derivatives. Some useful difunctional carboxylic acids are disclosed in U.S. Pat. No. 3,169,121, which is hereby incorporated herein by reference.

Particularly useful difunctional carboxylic acids, preferably their ester forming reactive derivatives, are the difunctional aromatic carboxylic acids.

The preferred ester forming reactive derivatives of the difunctional aromatic carboxylic acids are the acid dihalides, preferably the acid dichlorides. Some illustrative non-limiting examples of these derivatives are isophthaloyl dichloride, terephthaloyl dichloride, and mixtures thereof. A particularly useful mixture of the ester forming reactive derivatives of isophthalic acid and terephthalic acid is one which contains, in a weight ration, from about 1:10 to about 9.8:0.2 of isophthaloyl dichloride to terephthaloyl dichloride.

Particularly useful copolyester-carbonates are those containing from about 70 to about 80 mole percent ester content, said ester content being comprised of from about 1 to about 10 mole percent residues of terephthaloyl dichloride and from about 90 to about 99 mole percent residues of isophthaloyl dichloride. In these copolyester-carbonates the carbonate precursor is preferably phosgene and the dihydric phenol is preferably bisphenol-A.

A particularly useful method for preparing the copolyester-carbonates of the instant invention is the interfacial polymerization process utilizing an aqueous caustic solvent, a water immiscible organic solvent such as methylene chloride, a catalyst, and a molecular weight regulator.

The catalysts which may be employed are any of the well known catalysts which catalyze the copolyester-carbonate forming reaction. These catalysts include, but are not limited to, tertiary amines such as triethylamine, tripropylamine, N,N-dimethylaniline, quaternary phosphonium compounds, and quaternary ammonium compounds.

The molecular weight regulators are any of the known compounds that regulate the molecular weight of the copolyester-carbonate by a chain terminating mechanism. These compounds include, but are not limited to, phenol, tertiarybutyl phenol, and chroman-I.

The instant copolyester-carbonates will have a weight average molecular weight in the range of from about 20,000 to about 200,000, and preferably from about 25,000 to about 100,000.

Also included within the scope of the instant invention are the thermoplastic randomly branched high molecular weight aromatic copolyester-carbonates.

These randomly branched copolyester-carbonates are derived from (i) a dihydric phenol, (ii) a carbonate precursor, (iii) an ester precursor, and (iv) a minor amount of a branching agent. The branching agents are well known compounds and are generally aromatic compounds containing at least three functional groups which may be hydroxyl, carboxyl, carboxylic anhydride, haloformyl, or mixtures thereof. Some illustrative non-limiting examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, and benzophenonetetracarboxylic acid.

Also included herein are blends of linear and branched copolyester-carbonates.

The high molecular weight thermoplastic aromatic polycarbonates which form component (ii) of the instant compositions are well known materials which are generally commercially available. These polycarbonates, as well as methods for their preparation, are disclosed, inter alia, in U.S. Pat. Nos. 2,999,835, 3,028,365, 3,275,601, 3,334,154, and 3,989,672, all of which are incorporated herein by reference.

These polycarbonates may be conveniently prepared via the interfacial polymerization process by reacting at least one dihydric phenol of Formula I with a carbonate precursor such as phosgene.

These polycarbonates contain recurring structural units represented by the general formula

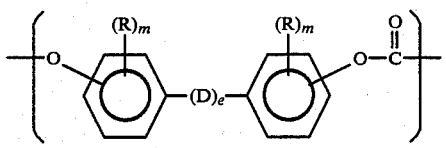

wherein R, D, m and e are as defined hereinafore.

The instant polycarbonates generally have a weight average molecular weight of from about 20,000 to about 200,000, and preferably from about 25,000 to about 100,000. It is generally preferred that the instant polycarbonates have an intrinsic viscosity in methylene chloride at 25° C. of at least about 0.4 dl./gm.

Also included herein are the randomly branched high molecular weight thermoplastic aromatic polycarbonates derived from a dihydric phenol, a carbonate precursor, and a branching agent of the type described hereinafore.

The amorphous polyester resin for use as component (ii) herein is a polyester which can, without limitation, comprise the reaction products of: (a) a glycol portion comprising 1,4-cyclohexanedimethanol with an acid portion comprising terephthalic acid, isphthalic acid, or mixtures thereof; or (b) a glycol portion comprising 1,4-cyclohexanedimethanol and ethylene glycol wherein the molar ratio of the 1,4-cyclohexane-dimethanol to ethylene glycol in the glycol portion is from about 4:1 to 1:4, with an acid portion comprising terephthalic acid, isophthalic acid, or mixtures thereof.

The copolyester component (iii) may be prepared by procedures well known in the art, such as by condensation reactions substantially as shown and described in U.S. Pat. No. 2,901,466, which is hereby incorporated herein by reference. More particularly, the acid or mixture of acids or alkyl esters of the aromatic dicarboxylic acid or acids, for example dimethylterephthalate, together with the dihydric alcohols are charged to a flask and heated to temperatures sufficient to cause condensation of the copolymer to begin, for example 175°–225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually. Generally, however, when as alkyl ester of the dicarboxylic acid compound is employed, an ester interchange type of catalyst is preferred, such as NaHTi(OC$_4$H$_9$)$_6$ in n-butanol. If a free acid is being reacted with free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can be advantageously increased with or without the immediate application of a vacuum. As the temperature is further increased, the pressure can be advantageously greatly reduced and the condensation allowed to proceed until the desired degree of polymerization is achieved. The product can be considered finished at this stage or can be subjected to further polymerization in the solid phase in accordance with well known techniques. Thus, the highly monomeric condensation product can be collected, pulverized, and the powder heated to a temperature somewhat less than that employed during the last stage of the molten phase polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase is advantageously conducted with agitation employing inert atmosphere at either normal atmospheric pressure or under greatly reduced pressure.

These copolyesters will generally have an intrinsic viscosity of at least about 0.4 dl./gm. as measured in 60/40 phenol/tetrachloroethane or other similar solvent at about 25° C. and will have a heat distortion temperature of from about 60° c. to about 70° C. The relative amounts of the 1,4-cyclohexanedimethanol to ethylene glycol in the glycol portion may vary so long as the molar ratio of 1,4-cyclohexanedimethanol to ethylene glycol is from 1:4 to 4:1, in order to provide a polyester copolymer having suitable heat distortion temperature within the recited range and other suitable properties.

A quite useful polyester for use as the amorphous polyester copolymer component (iii) is a copolyester of type (b) as described hereinafore wherein the glycol portion has a predominance of ethylene glycol over 1,4-cyclohexanedimethanol, for example greater than 50/50 and especially preferably is about 70 molar ethylene glycol to 30 molar 1,4-cyclohexanedimethanol and the acid portion is terephthalic acid. A preferred copolyester of this type is commercially available under the tradename KODAR PETG 6763 from Eastman Chemical Co. A preferred polyester is a type (a) polyester which is derived from 1,4-cyclohexanedimethanol as the glycol portion and a mixture of isophthalic acid and terephthalic acid as the acid portion. This type of polyester is available under the tradename KODAR A150.

Component (iv) of the instant compositions may be comprised of at least one olefin acrylate, at least one polyolefin, at least one olefin-rubbery diene terpolymer, or mixtures thereof. The olefin acrylate which comprises component (iv) is made from an olefin, e.g., ethylene, propylene, or the like, copolymerized with one or more of a comonomer comprising a $C_1$–$C_6$ alkyl acrylate, e.g., methyl acrylate, ethyl acrylate, hexyl acrylate, and the like; a $C_1$–$C_6$ alkyl methacrylate, e.g., methyl methacrylate, ethyl methacrylate, hexyl methacrylate, and the like; acrylic acid; or methacrylic acid. Especially preferred are the well known copolymers of ethylene with an alkyl ester of acrylic acid. These are described in U.S. Pat. No. 2,953,551, which is hereby incorporated herein by reference. Generally, the acrylate or methacrylate portion of the copolymer can range from about 10 to about 30 weight percent. The olefin portion of the copolymer can range from about 70 to about 90 weight percent. The preferred copolymer for use as component (iv) is an ethylene ethyl acrylate copolymer, preferably one in which the weight ratio of the ethylene fraction to the ethyl acrylate fraction is about 4.5 to 1. Suitable olefin acrylate copolymers, as defined hereinafore, can be prepared by methods well known in the art or can be obtained commercially, as for example from Union Carbide. Union Carbide's Bakelite DPD-6169 ethylene ethyl acrylate copolymer is suitable for use in the instant invention.

Component (iv) may also be comprised of a polyolefin. The polyolefins may be homopolymers or copolymers. The polyolefins are compounds which are well known in the art. Preferred for use in this invention are polymers which have been derived from olefins containing from 2 to about 10 carbon atoms. Some illustrative non-limiting examples of these polyolefins include polypropylene, polyethylene, polybutylene, polyisobutylene, and ethylenepropylene copolymers.

Methods for the preparation of these polymers are abundantly described in the literature and known to those skilled in the art. The polyethylenes can be prepared by various procedures, using anionic, cationic or free-radical initiating catalysts, with conditions varied to produce a range of molecular weights and densities and various degrees of branching or non-branching for the polymer. In one procedure, which involves free-radical initiation, ethylene gas is polymerized in the presence of a peroxide initiating catalyst as a pressure between 15,000 and 40,000 psi and a temperature between 100° and 200° C., to produce a relatively low density polymer, 0.90 to 0.94 gm./cm$^3$.

The polyethylene can also be prepared by low pressure processes effective to attain a polymer of higher molecular weight and a higher density. In one such procedure, known as the Phillips process, ethylene is contacted in an inert solvent with a slurry of a catalyst, such as chromium oxide supported on silica-aluminum, at pressures of 400 to 500 psig and temperatures of 130° to 170° C., followed by extraction of the polymer with hot solvent and purification, to produce a polyethylene product having a density between 0.96 to 0.97 gm/cm$^3$.

Still other procedures are possible, such as emulsion polymerization in aqueous media in the presence of a peroxy compound, as well as suspension polymerization at low temperatures using a silver salt-peroxide redox system.

Also employable as component (iv) is polypropylene, a common commercial form of which is crystalline isotatic polypropylene. Such polymers can be prepared by anionically initiated reactions using Ziegler type catalysts, e.g., titanium halide such as TiCl$_3$ in combination with an organometallic co-catalyst such as trialkyl aluminum halide. Polymerization generally proceeds rapidly at temperatures between 25° C. and 100° C. to yield a polymer in the form of a slurry of insoluble granular powder.

Copolymers of ethylene and propylene can be prepared using procedures similar to those for polyethylene and other polyolefins; for instance, by the polymerization reaction of a mixture of ethylene and propylene in the presence of a Ziegler type catalyst or by free-radical initiation under high pressures.

Polymers based on still higher olefins are not as readily available and, therefore, not as preferred. Examples of such higher polyolefins are polymers based on 2-methyl-1-butene; 1-pentene; 4-methyl-1-pentene and isobutylene. They can be prepared by known procedures including those described in The Encyclopedia of Polymer Science and Technology, John Wiley & Sons, Inc. Vol. 9, pp. 440–460 (1965).

The linear low density polyolefins may be prepared by state-of-the-art polymerization processes such as those described in U.S. Pat. No. 4,076,698, incorporated herein by reference. The polymer may have a density between 0.89 and 0.96 gm/cc and a controlled concentration of a simple side chain branching as opposed to random branching which distinguishes it from polymers such as high pressure low density polyethylene and high density polyethylene. The preferred range of density is 0.915 to 0.945 gm/cc. The linear low density polymers are preferably made from ethylene and alpha olefins of three to 8 carbon atoms, e.g., butene-1 and octene-1, or mixtures thereof. The comonomer is used in minor amounts, e.g., 10 mol % or less of the total amount of monomers. A preferred range is about 1–3 mol %. A particularly useful copolymer is made from ethylene and butene-1 such as Escorene LPX-15 of Exxon.

The olefin-rubbery diene polymers which comprise component (iv) of the instant compositions are well known in the art and are generally commercially available or may be readily prepared by known methods. They may be prepared by the reaction of an olefin with a rubbery diene. The olefins which may be reacted with the dienes are the known olefins as described hereinafore, preferably the lower olefins such as ethylene, propylene, butylene, and the like. The dienes include the known dienes such as the norbornenes such as ethylidene norbornene, butadiene, pentadiene, isoprene, cyclopentadiene, cyclohexadiene, and the like. Preferred olefin-diene polymers are the terpolymers formed by the reaction of two olefins with a diene. Particularly useful terpolymers are those of the EPDM family such as ethylene propylene diene terpolymers. Some illustrative non-limiting examples of the EPDM type polymers include ethylene propylene norbornene, ethylene propylene ethylidene norbornene, ethylene propylene pentadiene, ethylene propylene cyclopentadiene, and the like. These EPDM type terpolymers are well known in the art and are generally commercially available from several sources such as, for example, Epsyn 704 from Copolymer Rubber, and the Vistalon Series from Exxon Chemicals such as Vistalon 3708, Vistalon 2504, and the like.

The amounts of components (ii), (iii) and (iv) present in the instant compositions are amounts which are effective to positively upgrade the environmental stress crazing and cracking properties, i.e., resistance to relatively weak organic solvents, and to positively upgrade the impact properties, e.g., impact strength and ductility, of the instant compositions. Greater than these amounts of components (ii), (iii) and (iv) may be employed so long as the properties desired for a particular application of these compositions are substantially maintained. That is to say, the amounts of components (ii)–(iv) present in the instant compositions are amounts effective to improve the environmental stress crazing and cracking properties and the impact properties of the instant compositions but insufficient to significantly deleteriously affect substantially most of the other advantageous properties thereof.

Generally a minimum of about 10 weight percent of component (ii), a minimum of about 2 weight percent of component (iii), and a minimum of about 1 weight percent of component (iv) are sufficient to observe an improvement in resistance to relatively weak organic solvents and an improvement in impact properties such as impact strength and ductility. A minimum of about 15 weight percent of component (ii), about 4 weight percent of component (iii), and a minimum of about 2 weight percent of component (iv) are preferred; while a minimum of about 20 weight percent of component (ii), a minimum of about 5 weight percent of component (iii), and a minimum of about 3 weight percent of component (iv) are more preferred. A level of about 75 weight percent of component (ii), about 25 weight percent of component (iii), and about 20 weight percent of component (iv) should generally not be exceeded; preferably a level of about 70 weight percent of component (ii), about 20 weight percent of component (iii), and about 15 weight percent of component (iv); and more preferably a level of about 60 weight percent of component (ii), about 15 weight percent of component (iii), and about 10 weight percent of component (iv).

Weight percent is measured as the amounts of components (ii), (iii) or (iv) in the total of components (i)–(iv).

The instant compositions generally contain a minimum of about 20 weight percent of component (i), preferably a minimum of about 25 weight percent of said copolyester-carbonate resin, and more preferably a minimum of about 30 weight percent of component (i). Weight percent of component (i) is measured as the amount of component (i) present in the total of components (i), (ii), (iii), and (iv).

The compositions of the instant invention thus generally contain, in percent by weight, from about 20 to about 85% of (i), from about 10 to about 75% (ii), from about 2 to about 35% (iii) and from about 1 to about 20% (iv); preferably from about 25 to about 80% (i), from about 15 to about 70% (ii), from about 4 to about 20% (iii), and from about 2 to about 15% (iv); and more preferably from about 30 to about 70% (i), from about 20 to about 60% (ii), from about 5 to about 15% (iii), and from about 3 to about 10% (iv). Weight percent is measured based on the totals of components (i)–(iv) present in the compositions.

The compositions of the instant invention may optionally have admixed therewith the commonly known and used additives such as, for example, antioxidants; mold release agents; inert fillers such as glass fibers, glass spheres, talc, clay, and mica; ultraviolet radiation stabilizers such as the benzophenones, benzotriazoles, cyanocrylates, and benzylidene malonates; hydrolytic stabilizers such as the epoxides disclosed in U.S. Pat. Nos. 3,489,716, 3,138,379 and 3,839,247, all of which are hereby incorporated herein by reference; color stabilizers such as the organophosphites disclosed in U.S. Pat. Nos. 3,305,520 and 4,118,370, both of which are incorporated herein by reference; and flame retardants.

Some particularly useful flame retardants are the alkali and alkaline earth metal salts of sulfonic acids. These types of flame retardants are disclosed, inter alia, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are incorporated herein by reference. These flame retardant compounds are present in amounts effective to render the instant compositions flame retardant. In general these amounts range from about 0.01 to about 10 weight percent, based on the total amounts of flame retardant and components (i)–(iv) present in the compositions.

DESCRIPTION OF THE PREFERRED EMBODIMENTS

In order that those skilled in the art may better understand how the instant invention may be practiced, the following examples are set forth by way of illustration and not by way of limitation. In the examples all parts and percentages are on a weight basis unless otherwise indicated.

The following examples illustrate compositions falling outside the scope of the instant invention. They are presented for comparative purposes only.

EXAMPLE 1

A copolyester-carbonate resin derived from bisphenol-A, phosgene, and a mixture of isophthaloyl dichloride and terephthaloyl dichloride, containing a 75 mole percent ester content, 93 mole percent of said ester content being derived from isophthaloyl dichloride and 7 mole percent of said ester being derived from terephthaloyl dichloride, is fed to an extruder operating at a temperature of 288° C. The extrudate is comminuted into pellets and the pellets are injection molded at about 300° C. to about 340° C. into test specimens measuring 63.5 mm × 12.75 mm × 3.2 mm thick and 63.5 mm × 12.7 mm × 6.4 mm thick.

EXAMPLE 2

A composition containing 85 parts by weight of the copolyester-carbonate resin of Example 1, 10 parts by weight of a polyester derived from a mixture of isophthalic acid and terephthalic acid and 1,4-cyclohexanedimethanol (Eastman KODAR A150), and 5 parts by weight of ethylene ethyl acrylate was prepared by blending the ingredients together in a laboratory tumbler. The resulting mixture was fed to an extruder operating at a temperature of about 288° C. The extrudate was comminuted into pellets, and the pellets were injection molded at about 300° C. to about 340° C. into test specimens measuring 63.5 mm × 12.7 mm × 3.2 mm thick and 63.5 mm × 12.7 mm × 6.4 mm thick.

The following example illustrates a composition falling within the scope of the instant invention.

EXAMPLE 3

A composition containing 51 parts by weight of the copolyester-carbonate resin of Example 1, 34 parts by weight of a polycarbonate resin derived from bisphenol-A and phosgene and having an intrinsic viscosity in methylene chloride at 25° C. of from about 0.45 to about 0.49 dl./gm., 10 parts by weight of KODAR A150, and 5 parts by weight of ethylene ethyl acrylate was prepared by blending the ingredients together by mixing them in a laboratory tumbler. The resulting mixture was used to prepare test specimens substantially in accordance with the procedure of Example 2.

Some of the test specimens from Examples 1-3 were mounted on an ASTM stress jig (0.7% strain/170 kg$_f$/cm.$^2$) and soaked in a preheated (70° C.) windshield washing solution, General Motors' OPTIKLEEN, for two hours. These specimens were removed from the jig, the washing solution allowed to evaporate at room temperature for 24 hours, and then subjected to the Notched Izod test, ASTM D256. The results of this test are set forth in Table I. Other specimens from Examples 1-3 were subjected to the Notched Izod test without having been soaked in said washing solution. The results of this test are also set forth in Table I.

In Table I the numerical superscripts indicate the percent of test specimens which were ductile in failure, no superscript indicating 100% ductility.

TABLE I

| Example No. | Before Soaking in Washing Solution Notched Izod (kg$_f$cm./cm.) | | After Soaking in Washing Solution Notched Izod (kg$_f$cm./cm.) | |
|---|---|---|---|---|
| | 3.2 mm | 6.4 mm | 3.2 mm | 6.4 mm |
| 1 | 49.0[0] | 10.9[0] | broke | — |
| 2 | 33.8[40] | 31.0[40] | 33.8[40] | 31.0[40] |
| 3 | 65.9 | 49.0 | 65.9 | 42.5[50] |

As illustrated by the data in Table I the composition of the instant invention (Example 3) exhibits a greatly improved resistance to mild organic solvents as well as greatly improved impact properties, i.e., impact strength and ductility, than an unmodified copolyester-carbonate resin (Example 1). The instant composition also exhibits better resistance to mild organic solvents and better impact properties than a composition containing components (i), (iii) and (iv) but lacking the polycarbonate component (ii), i.e., Example 2.

It is the particular combination of components (i)-(iv) which results in the instant compositions exhibiting particularly good resistance to mild organic solvents and having particularly good impact properties.

The foregoing detailed description has been given for clearness of understanding only and no unnecessary limitations are to be understood or implied therefrom. The invention is not limited to the exact details shown and described herein, for obvious modifications will occur to those skilled in the art.

What is claimed is:

1. A copolyester-carbonate composition exhibiting improved resistance to mild organic solvents comprising, in admixture:
   (i) at least one high molecular weight thermoplastic aromatic copolyester-carbonate resin containing from about 25 to about 90 mole percent ester bonds;
   (ii) at least one high molecular weight thermoplastic aromatic polycarbonate resin;
   (iii) at least one amorphous polyester resin containing the reaction products of
      (a) at least one polyol selected from 1,4-cyclohexanedimethanol or a mixture of 1,4-cyclohexanedimethanol and ethylene glycol, and
      (b) at least one aromatic dicarboxylic acid or its ester forming reactive derivative selected from isophthalic acid, terephthalic acid, or mixtures thereof; and
   (iv) at least one polymer selected from
      (a) an olefin acrylate copolymer,
      (b) a polyolefin, and
      (c) an olefin diene terpolymer; components (ii)-(iv) being present in amounts at least sufficient to impart to said composition a resistance to mild organic solvents greater than that possessed by said copolyester-carbonate resin.

2. The composition of claim 1 which contains from about 20 to about 85 weight percent of (i), from about 10 to about 75 weight percent of (ii), from about 2 to about 25 weight percent of (iii), and from about 1 to about 20 weight percent of (iv).

3. The composition of claim 2 which contains from about 25 to about 85 weight percent (i), from about 15 to about 70 weight percent (ii), from about 4 to about 20 weight percent (iii), and from about 2 to about 15 weight percent (iv).

4. The composition of claim 3 which contains from about 30 to about 70 weight percent (i), from about 20 to about 60 weight percent (ii), from about 5 to about 15 weight percent (iii), and from about 3 to about 10 weight percent (iv).

5. The composition of claim 1 wherein (iv) is an olefin acrylate copolymer.

6. The composition of claim 5 wherein said olefin acrylate copolymer is a copolymer of an olefin and at least one of a $C_1-C_6$ alkyl acrylate, a $C_1-C_6$ alkyl methacrylate, acrylic acid, or methacrylic acid.

7. The composition of claim 6 wherein said olefin acrylate copolymer is a copolymer of an olefin and a $C_1-C_6$ acrylate.

8. The composition of claim 7 wherein said alkyl acrylate is ethyl acrylate.

9. The composition of claim 8 wherein said olefin is ethylene.

10. The composition of claim 1 wherein (iv) is a polyolefin.

11. The composition of claim 10 wherein said polyolefin is a polyolefin copolymer.

12. The composition of claim 11 wherein said polyolefin copolymer is an ethylene propylene copolymer.

13. The composition of claim 1 wherein (iv) is an olefin-diene terpolymer.

14. The composition of claim 13 wherein said olefin-diene terpolymer is an ethylene propylene diene terpolymer.

15. The composition of claim 14 wherein said diene is norbornene.

16. The composition of claim 15 wherein said norbornene is ethylidene norbornene.

17. The composition of claim 16 wherein said olefin-diene terpolymer is ethylene propylene ethylidene norbornene terpolymer.

18. The composition of claim 1 wherein said aromatic dicarboxylic acid or its ester forming reactive derivative is a mixture of isophthalic acid and terephthalic acid or their ester forming reactive derivatives.

19. The composition of claim 18 wherein said glycol is selected from mixtures of 1,4-cyclohexanedimethanol and ethylene glycol, said mixtures containing a molar ratio of 1,4-cyclohexanedimethanol to ethylene glycol of from about 1:4 to about 4:1.

20. The composition of claim 18 wherein said glycol is 1,4-cyclohexanedimethanol.

21. The composition of claim 1 wherein said polycarbonate of (ii) is derived from a dihydric phenol and a carbonate precursor.

22. The composition of claim 21 wherein said carbonate precursor is phosgene.

23. The composition of claim 22 wherein said dihydric phenol is bisphenol-A.

24. The composition of claim 1 wherein said copolyester-carbonate resin (i) is derived from at least one dihydric phenol, a carbonate precursor, and an ester precursor.

25. The composition of claim 24 wherein said carbonate precursor is phosgene.

26. The composition of claim 25 wherein said ester precursor is selected from isophthaloyl dichloride, terephthaloyl dichloride, and mixtures thereof.

27. The composition of claim 26 wherein said ester precursor is a mixture of isophthaloyl dichloride and terephthaloyl dichloride.

28. The composition of claim 27 wherein said dihydric phenol is bisphenol-A.

29. The composition of claim 28 wherein said copolyester-carbonate resin has an ester content of from about 70 to about 80 mole percent.

30. The composition of claim 29 wherein said ester content is comprised of from about 1 to about 10 mole percent of the residue of terephthaloyl dichloride and from about 90 to about 99% mole percent of the residue of isophthaloyl dichloride.

31. The composition of claim 1 which further contains a flame retardant amount of at least one flame retardant compound.

32. The composition of claim 31 wherein said flame retardant compound is selected from the alkali and alkaline earth metal salts of organic sulfonic acids.

* * * * *